United States Patent
Boehm et al.

(10) Patent No.: US 9,466,990 B2
(45) Date of Patent: Oct. 11, 2016

(54) METHOD FOR ENHANCING A BATTERY MANAGEMENT SYSTEM, BATTERY MANAGEMENT SYSTEM, BATTERY SYSTEM AND MOTOR VEHICLE

(71) Applicants: Robert Bosch GmbH, Stuttgart (DE); Samsung SDI Co., Ltd., Yongin-si, Gyeonggi-do (KR)

(72) Inventors: Andre Boehm, Kornwestheim (DE); Stefan Wickert, Albershausen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 212 days.

(21) Appl. No.: 13/942,860

(22) Filed: Jul. 16, 2013

(65) Prior Publication Data
US 2014/0021926 A1 Jan. 23, 2014

(30) Foreign Application Priority Data
Jul. 19, 2012 (DE) .................. 10 2012 212 667

(51) Int. Cl.
H02J 7/16 (2006.01)
H02J 7/00 (2006.01)

(52) U.S. Cl.
CPC ............... *H02J 7/00* (2013.01); *H02J 7/0029* (2013.01); *H02J 2007/0037* (2013.01)

(58) Field of Classification Search
CPC .... H02J 7/007; H02J 7/0047; G01R 31/3606
USPC ................................................. 320/132–137
See application file for complete search history.

(56) References Cited

U.S. PATENT DOCUMENTS

| | | | | |
|---|---|---|---|---|
| 5,811,890 A | * | 9/1998 | Hamamoto | ........ G01R 31/3648 307/66 |
| 2006/0152196 A1 | * | 7/2006 | Matsumoto et al. | ......... 320/132 |
| 2011/0112782 A1 | * | 5/2011 | Majima | ................ G01R 31/361 702/63 |
| 2013/0162218 A1 | * | 6/2013 | Kang et al. | .................... 320/134 |
| 2014/0184166 A1 | * | 7/2014 | Ohkawa | .............. H01M 10/441 320/134 |

FOREIGN PATENT DOCUMENTS

| | | |
|---|---|---|
| DE | 33 17 834 A1 | 11/1983 |
| DE | 44 03 468 A1 | 8/1995 |
| DE | 102 57 588 B3 | 10/2004 |
| DE | 10 2008 036 159 A1 | 5/2009 |
| DE | 10 2008 041 300 A1 | 2/2010 |

* cited by examiner

*Primary Examiner* — Nghia Doan
(74) *Attorney, Agent, or Firm* — Maginot, Moore & Beck LLP

(57) ABSTRACT

A method for enhancing a battery management system for determining at least one limit value for a first characteristic variable of a battery. The method includes measuring different values of a further characteristic variable for predetermined values of the first characteristic variable in order to determine limit values of the further characteristic variable for charging and/or discharging the battery for the predetermined values of the first characteristic variable, with the result that battery discharging or charging corresponding to the limit values does not result in a battery voltage outside a permissible battery voltage range if the battery has that predetermined value of the characteristic variable which is associated with the respective limit value. The method further includes determining charging and/or discharging limit values of the characteristic variable for predetermined values of the further characteristic variable using the determined charging and/or discharging limit values.

12 Claims, 2 Drawing Sheets

METHOD FOR ENHANCING A BATTERY MANAGEMENT SYSTEM, BATTERY MANAGEMENT SYSTEM, BATTERY SYSTEM AND MOTOR VEHICLE

This application claims priority under 35 U.S.C. §119 to patent application no. DE 10 2012 212 667.8, filed on Jul. 19, 2012 in Germany, the disclosure of which is incorporated herein by reference in its entirety.

BACKGROUND

The present disclosure relates to a method for enhancing a battery management system, for example for a rechargeable battery constructed from lithium ion battery cells or nickel metal hydride battery cells, to a battery management system, to a battery system and to a motor vehicle.

Batteries are being used more and more widely as a result of improved storage capacity, more frequent rechargeability and higher energy densities. Batteries with a relatively low energy storage capacity are used, for example, for small portable electronic devices such as mobile telephones, laptops, camcorders and the like, while batteries with a high capacity are used as an energy source to drive motors of hybrid or electric vehicles etc. or as stationary batteries.

Batteries may be formed, for example, by connecting battery modules in series, the battery modules also being connected in parallel in some cases and the battery modules in turn being able to consist of battery cells which are connected in series and/or in parallel.

Battery management systems are used for battery management, for example in order to fundamentally control modules, to increase the safety of batteries, to increase efficiency and to extend the lifetime of battery modules and battery systems composed of battery modules, in particular in motor vehicles, but not only there. One task of battery management systems is to determine the instantaneous state of charge or ageing state of the battery modules and the battery cells contained in the battery module, the battery state depending on the battery current and battery temperature of the battery cells or battery module.

The published patent application DE 10 2008 041 300 A1 describes a method for determining the actual state of charge of an electrical rechargeable battery. The method comprises: recording the rechargeable battery current supplied to the rechargeable battery and the rechargeable battery current flowing away from the rechargeable battery; providing a charge difference by integrating the rechargeable battery current over time; updating a measurement state of charge by adding the charge difference to the measurement state of charge; and deriving an estimated state of charge from a unique predefined association between states of charge and open-circuit voltages of the rechargeable battery on the basis of an open-circuit voltage of the rechargeable battery. Another method for determining the state of charge is known from the published patent application DE 10 2008 036 159 A1.

In order to increase efficiency and extend the lifetime, it is helpful to know the respective instantaneous power limits for charging and discharging the battery cell or battery module. It is then possible to prevent the cell or the module from being discharged or charged while contravening the power limits. This is because charging or discharging processes while contravening the power limit result in rapid ageing. In this case, the charging and discharging limits are each dependent on the instantaneous state of the battery cell/battery module.

In this case, the charging or discharging limit values can be determined in different ways. Their determination is based on functional relationships between the state of charge, battery current, battery voltage, battery temperature and battery power. For example, the power depends at least on the voltage and current, changes in the state of charge and in the temperature depend at least on the current and the voltage depends at least on the state of charge.

DE 33 17 834 C2 discloses a method in a control system for the traction motor of an electric vehicle with a traction battery, in which a discharge current target value predefined with the aid of an accelerator pedal is compared with two limit values and is limited, if necessary, in order to avoid overloading.

SUMMARY

The disclosure provides a method for enhancing a battery management system, the battery management system being enhanced in order to determine at least one limit value for a characteristic variable of a battery for charging and/or discharging the battery. According to the disclosure, the battery management system is characterized by the steps of: measuring different values of a further characteristic variable for predetermined values of the one characteristic variable in order to determine limit values of the further characteristic variable for charging and/or discharging the battery for the predetermined values of the one characteristic variable, with the result that battery discharging or charging corresponding to the limit values does not result in a battery voltage outside a permissible battery voltage range if the battery has that predetermined value of the characteristic variable which is associated with the respective limit value, determining charging and/or discharging limit values of the characteristic variable for predetermined values of the further characteristic variable using the determined charging and/or discharging limit values, and storing the determined charging and/or discharging limit values of the further characteristic variable in a memory apparatus of the battery management system.

The practice of storing value associations between charging and/or discharging limit values and predetermined values in the memory then allows, during ongoing operation, the simple determination of the charging and/or discharging limit values which can be associated with an instantaneous estimated value of the further characteristic variable and must be currently complied with in order to avoid premature battery ageing caused by overvoltage or undervoltage.

In one possible embodiment, the one characteristic variable is a battery state of charge or a battery open-circuit voltage, and the further characteristic variable is a battery power or a battery current. In this case, the limit values of the further characteristic variable are determined in this possible embodiment in such a manner that battery discharging or charging corresponding to the limit value also does not result in a battery temperature increase above a temperature upper limit at a respective predetermined value of the battery state of charge or the battery open-circuit voltage.

In another possible embodiment, the one characteristic variable is a battery state of charge and the further characteristic variable is a battery energy or a battery open-circuit voltage.

The disclosure also proposes a battery management system 102 for a battery 104. The proposed battery management system 102 comprises a memory 106 and is characterized by an association of charging and/or discharging limit values of a characteristic variable of the battery with predetermined values of a further characteristic variable of the battery, which association is stored in the memory. In this case, battery discharging or charging corresponding to the limit values does not result in a battery voltage outside a permissible battery voltage range if the battery has that predetermined value of the further characteristic variable which is associated with the respective limit value.

In one possible embodiment, the one characteristic variable is a battery state of charge and the further characteristic variable is a battery power or a battery current, battery discharging or charging corresponding to the limit values also not resulting in a battery temperature increase above a temperature upper limit if the battery 104 has that predetermined value of the battery state of charge which is associated with the respective limit value.

In another possible embodiment, the one characteristic variable is a battery state of charge and the further characteristic variable is a battery energy.

The values (current and power) are negative during discharging and are positive during charging.

In a further possible embodiment, the battery management system 102 comprises an input 108 for receiving a charging or discharging minimum value for the further characteristic variable and for receiving a voltage measured value, a current intensity measured value and a battery temperature measured value. In this case, the battery management system 102 in this further possible embodiment is designed to estimate the characteristic variable from received voltage, current intensity and battery temperature measured values, to determine a limit value for the minimum value using the stored association, to compare the limit value associated with the minimum value with the estimate, to output a warning message at an output 110 if the minimum value is a discharging minimum value and the estimate is less than the limit value and/or to correct the minimum value using the stored association in such a manner that the estimate is equal to or greater than a limit value associated with the corrected minimum value in the stored association, and to output a warning message at an output 110 if the minimum value is a charging minimum value and the estimate is greater than the limit value and/or to correct the minimum value using the stored association in such a manner that the estimate is equal to or less than a limit value associated with the corrected minimum value in the stored association. Correcting the minimum value informs the vehicle (user of the battery 104) which value of the further characteristic variable can be used with the instantaneous battery state.

The disclosure also proposes a battery system 100, comprising battery cells 112 and the battery management system 102 according to the disclosure in the further possible embodiment, the battery management system 102 and the battery cells 112 being connected to one another in such a manner that the battery management system 102 or an inverter control device can manage or use the battery cells 112 according to the minimum value or the corrected minimum value.

The disclosure also proposes a motor vehicle comprising a battery system 100 according to the disclosure.

Finally, the disclosure also proposes a method for controlling the safety or ageing of a battery comprising battery cells. This method is characterized by the steps of: receiving voltage, current intensity and battery temperature measured values, estimating a value of a characteristic variable of the battery using the received voltage, current intensity and battery temperature measured values, receiving a charging or discharging minimum value according to a further characteristic variable of the battery, reading limit values of the characteristic variable which are stored in a memory and are associated with predetermined values of the further characteristic variable in order to determine a limit value to be associated with the received minimum value, comparing the determined limit value with the estimate, outputting a warning message at an output if the received minimum value is a charging minimum value and the estimate is greater than the limit value and/or correcting the minimum value such that the estimate is equal to or less than a limit value to be associated with the corrected minimum value, and outputting a warning message at the output if the received minimum value is a discharging minimum value and the estimate is less than the limit value and/or correcting the minimum value such that the estimate is equal to or greater than a limit value to be associated with the corrected minimum value.

BRIEF DESCRIPTION OF THE DRAWING

Exemplary embodiments of the disclosure are explained in more detail using the drawing and the following description. In the drawing.

DETAILED DESCRIPTION

Figure 1:
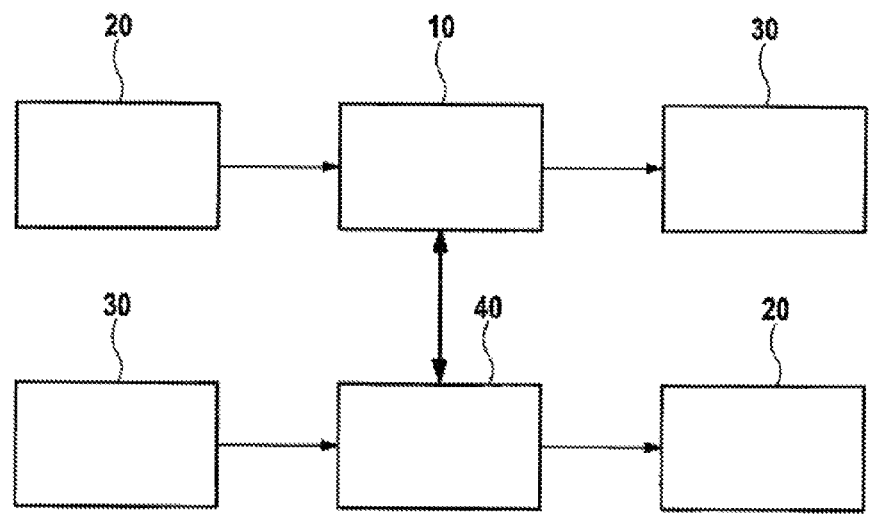
FIG. 1 shows, by way of example, the relationship between the characteristic variable, the further characteristic variable, a family of characteristics and stored values.
Figure 2:
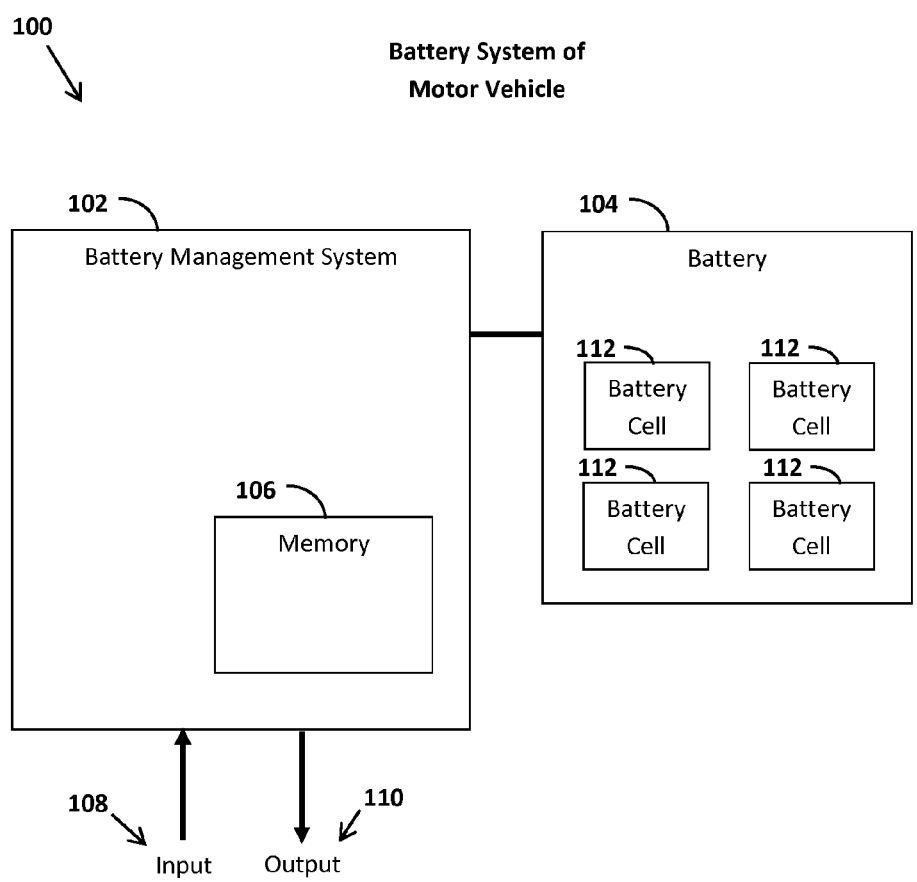
FIG. 2 shows a battery system.

One embodiment of the disclosure relates to a method which can be used to easily determine what power or energy the battery can deliver or receive (power limits). Additionally or alternatively, the method can be used to easily determine limits for the battery voltage, for the battery current and/or for the state of charge (SOC).

Since the battery is composed of a plurality of individual cells which may differ from one another in terms of their properties, the limits are described in an exemplary embodiment in such a manner that, if the limits for the battery are complied with, each individual cell also remains within its limits.

In the sense of the disclosure, power, voltage, SOC and current limits of the battery can be calculated in different ways, in the simplest case by means of families of characteristics which depend, for example, on the battery temperature and the state of charge. According to the disclosure, the limits, for example for the state of charge, can be calculated by means of inverse calculation. For this purpose, only the minimum available power, the minimum or maximum voltage or the maximum current must be defined. The determined limits for the battery are then corrected by the deviation of the individual cells which deviate most from the average value. The advantage of this disclosure is the simple determination of the families of characteristics by means of measurements on the test stand and the rapid calculation during operation. As a result of the inverse calculation, the limits then result without additional measurement or application effort.

In a first exemplary embodiment, the SOC limits are determined on the basis of the minimum power to be provided (in the charging and discharging direction). The power which can be delivered or received by the battery without becoming too hot in the process and without leaving the permissible voltage range is stored in families of characteristics. These families of characteristics are dependent on the SOC and the battery temperature. They may be easily determined, for example, by means of automated tests on the test stand. The inverse families of characteristics thereof can then be used to determine the limits for the state of charge for a minimum available/receivable desired power to be predefined.

As a second example, the SOC limits are explained on the basis of minimum specified available/receivable energy. The relationship between the SOC and the open-circuit voltage (OCV) can be linearly approximated with a proportionality factor. The release or delivery of energy can then be calculated by means of a reciprocal function (integral of the change in charge for a charging/discharging current to be predefined for a corresponding voltage) without additional application. The SOC limits for a minimum specified available/receivable energy can then be calculated by means of this reciprocal function.

The figure illustrates the relationship between the characteristic variable 20, the further characteristic variable 30, the family of characteristics 10 and stored values 40. Families of characteristics or characteristic functions 10 depend on characteristic variables 20, for example the battery temperature and/or state of charge of the battery, and allow limit values of one or more further characteristic variables 30, for example an available or receivable power and/or total energy, to be calculated using instantaneous values of the characteristic variables 20.

The families of characteristics or characteristic function 10 are unknown and are determined with the aid of measurements of the further characteristic variable 30 for predetermined values of the characteristic variable 20. Values 40 for storage in a memory device of a battery management system are determined by inverting the families of characteristics 10 determined in this manner or by determining a reciprocal characteristic function 10, which values depend on the further characteristic variables 30, for example an available or receivable power and/or total energy, and allow limit values of one or more characteristic variables 20, for example the battery temperature and/or state of charge of the battery, to be determined using instantaneous minimum values of the further characteristic variable 30.

The determination can then be as simple as looking in a look-up table for limit values or may additionally comprise only a linear interpolation on the basis of limit values stored in the look-up table.

What is claimed is:

1. A method of determining limit values for a first characteristic variable of a battery for at least one of charging and discharging the battery, comprising:
    setting values of the first characteristic variable to be used as predetermined values of the first characteristic variable;
    setting values of a second characteristic variable of the battery to be used as predetermined value of the second characteristic variable;
    determining a first family of characteristics of the battery by measuring limit values of the second characteristic variable for the predetermined values of the first characteristic variable, the limit values satisfying at least one limit criterion for the battery during at least one of charging and discharging the battery, the at least one limit criterion including that a voltage of the battery remains within a permissible voltage range of the battery when (i) the first characteristic variable of the battery is equal to one of the predetermined values of the first characteristic variable and (ii) the battery is at least one of being charged or discharged to a limit value of the second characteristic variable that corresponds to the one of the predetermined values of the first characteristic variable;
    determining limit values for the first characteristic variable based on the predetermined values of the second characteristic variable and the limit values of the second characteristic variable using the first family of characteristics; and
    storing the determined limit values of the second characteristic variable in a memory apparatus of a battery management system.

2. The method according to claim 1, wherein the first characteristic variable is at least one of a state of charge of the battery and an open circuit voltage of the battery.

3. The method according to claim 1, wherein the second characteristic variable is at least one of a power of the battery, a current of the battery, an energy of the battery, and an open-circuit voltage of the battery.

4. The method according to claim 1, wherein the at least one limit criterion includes that a temperature of the battery does not exceed a threshold temperature of the battery.

5. The method according to claim 1, the storing of the determined limit values of the second characteristic variable comprising:
    storing the determined limit values of the second characteristic variable in a memory apparatus as a look-up table that estimates the limit values for the second characteristic variable based on instantaneous values of the first characteristic variable.

6. The method according to claim 1, further comprising:
    storing the determined limit values of the first characteristic variable in a memory apparatus as a look-up table that estimates the limit values for the first characteristic variable based on instantaneous values of the second characteristic variable.

7. A method for controlling a battery comprising battery cells, comprising:
    receiving voltage, current intensity, and battery temperature measured values;
    estimating a value of a first characteristic variable of the battery using the received voltage, current intensity, and battery temperature measured values;
    receiving at least one of a charging minimum value and a discharging minimum value according to a second characteristic variable of the battery;
    reading a stored limit value of the first characteristic variable from the memory apparatus, the stored limit value being associated with a value of the second characteristic variable;
    comparing the stored limit value of the first characteristic variable with the estimated value of the first characteristic variable;
    outputting a warning message at an output in response to the received minimum value according to the second characteristic variable being a charging minimum value and the estimate of the first characteristic variable being greater than the limit value and correcting the minimum value such that the estimate is equal to or less than a limit value to be associated with the minimum value; and
    outputting a warning message at the output in response to the received minimum value according to the second characteristic variable being a discharging minimum value and the estimate of the first characteristic variable being less than the limit value and correcting the minimum value such that the estimate is equal to or greater than a limit value to be associated with the minimum value.

8. A battery management system for a battery, comprising:
a memory configured to store an association of limit values of a first characteristic variable with predetermined values of a second characteristic variable, the limit values satisfying at least one limit criterion for the battery during at least one of charging and discharging the battery, the at least one limit criterion including that a voltage of the battery remains within a permissible voltage range of the battery when (i) the second characteristic variable of the battery is equal to one of the predetermined values of the second characteristic variable and (ii) the battery is at least one of being charged or discharged to a limit value of the first characteristic variable that corresponds to the one of the predetermined values of the second characteristic variable; and
an input configured to receive (i) at least one of a charging minimum value and a discharging minimum value for the second characteristic variable, (ii) a voltage measured value, (iii) a current intensity measured value, (iv) and a battery temperature measured value
wherein the battery management system is configured (i) to estimate the first characteristic variable from the received voltage measured value, the received current intensity measured value, and the received battery temperature measured value, to determine a limit value for the at least one of the charging minimum value and the discharging minimum value using the stored association, (ii) to compare the limit value associated with the minimum value with the estimated first characteristic variable, (iii) to output a warning message at an output if the minimum value is a discharging minimum value and the estimated first characteristic variable is less than the limit value, and correct the minimum value using the stored association such that the estimated first characteristic variable is equal to or greater than a limit value associated with the minimum value in the stored association, and (iv) to output a warning message at an output if the minimum value is a charging minimum value and the estimated first characteristic variable is greater than the limit value, and correct the minimum value such that the estimated first characteristic variable is equal to or less than a limit value associated with the minimum value in the stored association.

9. The battery management system according to claim 8, wherein:
the first characteristic variable is a battery state of charge,
the second characteristic variable is at least one of a battery power and a battery current, and
the at least one limit criterion also includes that a temperature of the battery does not exceed a threshold temperature of the battery.

10. The battery management system according to claim 8, wherein:
the first characteristic variable is a battery state of charge, and
the second characteristic variable is a battery energy.

11. The battery management system according to claim 8, wherein:
a battery system includes the battery management system and a plurality of battery cells, and
the battery management system and the plurality of battery cells are connected to one another in such a manner that the battery management system is configured to manage the battery cells according to at least one of the minimum value and the corrected minimum value.

12. The battery management system according to claim 11, wherein a motor vehicle includes the battery system.

* * * * *